United States Patent [19]

McAfee

[11] Patent Number: 5,581,594
[45] Date of Patent: Dec. 3, 1996

[54] METHOD AND APPARATUS FOR INITIATING COMMUNICATION VIA PAGING A MOBILE COMPUTING DEVICE

[75] Inventor: Christopher L. McAfee, Loomis, Calif.

[73] Assignee: Intel Corporation, Santa Clara, Calif.

[21] Appl. No.: 599,032

[22] Filed: Feb. 9, 1996

Related U.S. Application Data

[63] Continuation of Ser. No. 120,558, Sep. 13, 1993, abandoned.
[51] Int. Cl.$^6$ .................................................. H04Q 7/20
[52] U.S. Cl. ................................................ 379/57; 379/58
[58] Field of Search .................................. 379/58, 59, 60, 379/61, 63, 56, 57; 455/33.1, 54.1, 54.2; 340/311.1

[56] References Cited

U.S. PATENT DOCUMENTS

| | | | |
|---|---|---|---|
| 4,856,046 | 8/1989 | Streck et al. | 379/56 |
| 5,090,051 | 2/1992 | Muppidi et al. | 379/61 |
| 5,241,410 | 8/1993 | Streck et al. | 379/56 |
| 5,307,399 | 4/1994 | Dai et al. | 379/57 |
| 5,315,645 | 5/1994 | Matheny | 379/56 |
| 5,327,480 | 7/1994 | Breeden | 379/57 |

*Primary Examiner*—Curtis Kuntz
*Assistant Examiner*—Michael B. Chernoff
*Attorney, Agent, or Firm*—Blakely, Sokoloff, Taylor & Zafman

[57] ABSTRACT

A wireless communication system including a paging-type system for sending messages to a mobile device. A wireless communication link is set up between the mobile device and a communication medium capable of allowing the mobile device to communicate with a location specified by the messages. In this manner, the mobile device is able to communicate within the system.

25 Claims, 5 Drawing Sheets

METHOD AND APPARATUS FOR INITIATING COMMUNICATION VIA PAGING A MOBILE COMPUTING DEVICE

This is a continuation of application Ser. No. 08/120,558, filed Sep. 13, 1993, now abandoned.

FIELD OF THE INVENTION

The present invention relates to the field of communications; particularly, the present invention relates to the field of wireless communications.

BACKGROUND OF THE INVENTION

Traditionally, voice and data communications were performed between stationary locations. A communication generated by a source at one location was transferred across a communication medium to a destination at another location. Possible sources and destinations may range from large broadcasting facilities to small communications devices having the capability of transferring voice and/or data information. The communications medium most prevalently used in the past is transmission cables or channels. More recently, wireless communication media, such as radio or infrared, have been used.

When multiple parties, or devices, communicate with one another in a communications system, the interaction between the parties is usually governed by a protocol. A protocol is the handshaking that occurs between the parties when communicating to initiate contact and route the connection. The protocol must locate the desired second party and signal the request for communication. The protocol must also identify the originator and its location to allow the second party to return communication.

The first step in a communication is the initiating of contact. In the case of a cellular phone system and other similar types of communications systems, communication initiation usually occurs on the same transmission medium used to transfer for communications when the system is in normal operation. In other words, in a cellular phone system, the cellular phone initiates calls on the same transmission medium that is used to route calls to it. Since call initiation is performed on the same transmission medium used for communication, the transmission medium must be optimized for two-way traffic. Because of this, the system cannot use transmission media which are optimal for call initiation if those transmission media would not be optimal in providing two-way communication. For instance, two-way communication systems must establish private channels that isolate users from all other system activity. This communication requirement is an obstacle for call initiation because the portion of the communication system dedicated to initiating contact must have the ability to communicate with multiple devices at once, or be forced to wait for the end of one communication before another can be started. Existing systems handle this obstacle using technology of increased complexity.

It is desirable to provide a system in which call initiation is not performed on the same transmission medium as the regular communication of the system so that both transmission media utilized when providing the system functionality and the transmission medium used for call initiation may both be optimized for their independent requirements.

Some protocols, such as those used in a local area network (LAN) environment, usually require that all clients (i.e., a device coupled to the network) identify themselves for the purposes of receiving calls or data packets that may be sent on the network in the future. Without proper identification, messages directed towards a particular client would never be routed to their destination.

The process of a client identifying itself is often referred to as registration. In all the higher level protocol systems, such as LAN protocols and cellular phone protocols, the client agents are required to register to use the system. For instance, if the user of a cellular phone desires to receive phone calls, the cellular phone must be turned on and it has to register. Registration is performed by transmitting an identification to a master station. The master station then completes the registration process by storing the identification as a future reference for communications on the system. In the case of a cellular system, registration comprises sending messages to the nearest cellular phone extension, commonly referred to as a base station. These messages include the phone number of the cellular phone and an indication that the cellular phone is in the area of the cellular phone extension. In response to the messages, the base station notifies a central switching office. If a party is trying to reach the user of the cellular phone, the central switching office is able to route the call to the user through the base station.

Another communication system that uses a protocol is a paging system. A paging system broadcasts messages which are received by a single target paging receiver that indicates to the user that a call is desired. For instance, a paging system can be used to indicate to the user that a phone communication is requested of the user. The page is often no more than a phone number. The page itself indicates the request. A page message is broadcast over a region, country, or worldwide with reception intended for a single user. Communication will succeed if the target user is anywhere within the service region of the page broadcast. Paging can initiate communication without a requirement that the targeted client register its location with the system. Once the message is received, the user of the paging receiver uses a telephone to call back the telephone number. One problem with the typical paging system is its lack of automation. For instance, when using a paging system, the user must locate a telephone in order to complete the communication. Because of this, the user is not able to provide uninterrupted attention to other matters, thereby resulting in reduced productivity. Therefore, it is desirable to provide a paging-type communication system where the call back function is automated.

Although cellular communication systems and paging communications systems exist, other wireless communications systems are in use today. For instance, radio is widely used for short range and long range communication. Infrared communication is also used widely today. Wireless communications systems are often limited in their range of communications. If a receiving device is out of range, the communication transmitted by the transmitting device will not be received. However, the transmitting device often does not know if the receiving device is in range. Therefore, it is possible that messages will be lost without the transmitting device knowing. Furthermore, the prior art protocols for use with radio and infrared communication usually allow the transmitter of a message to send the message independent of whether the message is being received. Therefore, in this case, a completed communication only occurs if the receiving device is set up and ready to receive the message. Thus, if the receiver is not ready, the transmitted message will not be received, thereby requiring retransmission. It is desirable to provide for wireless communication where the communication does not begin until the receiving device is ready to receive a communication or where the transmitting device knows that the receiving device is in range and able to receive the communication.

The present invention provides a wireless communications system that uses an automated protocol to provide communications for mobile devices. The present invention provides for the automated call initiation, transmission and reception of data communications using a wireless communications system. The present invention also provides for hailing communications devices to establish communications.

SUMMARY OF THE INVENTION

A method and apparatus for performing communications is described. The method and apparatus include a mechanism to initiate communication with a portable device with a message indicating that two-way communication is desired. The portable device receives the call initiation message and initiates a two-way communication with a service access device. In one embodiment, the two-way communication occurs using a short-range wireless communication means, such as infrared or radio. The present invention includes a method for hailing communications devices to allow establishment of a wireless two-way communication without user attention. The service access device provides access to a target or a secondary communication link. Once the two-way communication channel is established, the portable device is able to communicate via the secondary link with the person or system.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE INVENTION

Figure 1:
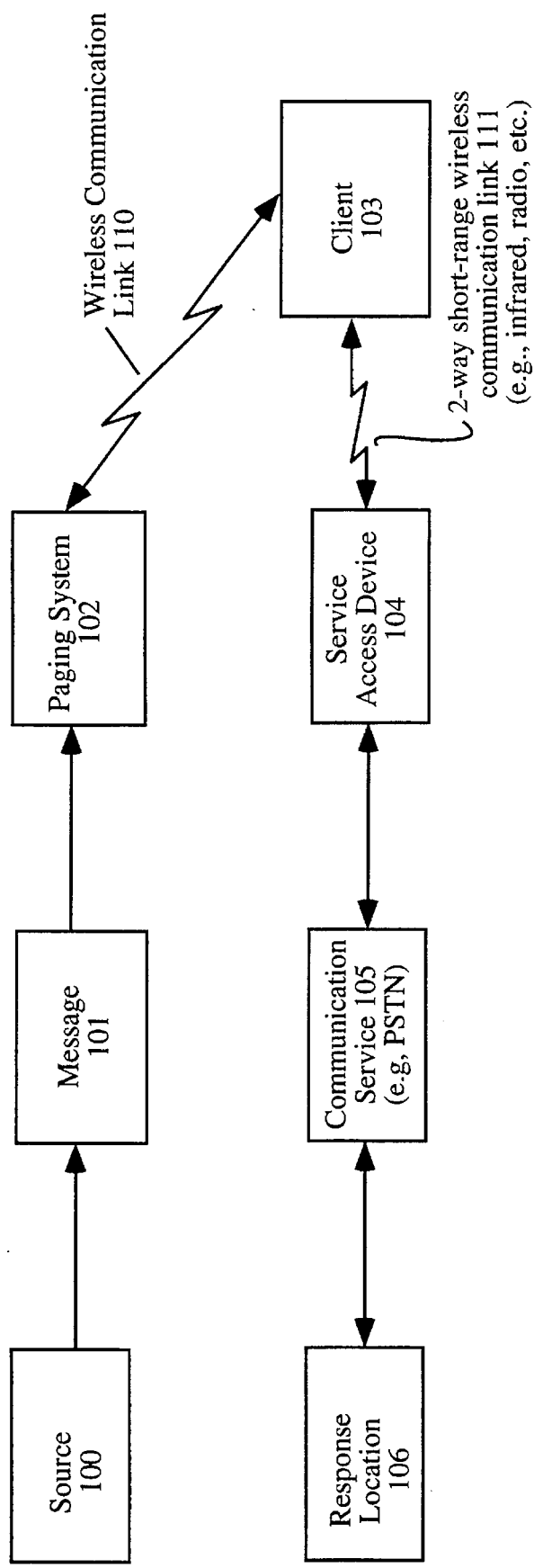
FIG. 1 is a block diagram of one embodiment of the communications system of the present invention.

A communications system is described. In the following detailed description of the present invention numerous specific details are set forth, such as specific interrupt names, numbers and types of I/O devices, etc., in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring the present invention.

The present invention provides a communication system that includes multiple communication links optimized for particular types of communications. In other words, the system uses multiple types of transmission media, each optimized for their particular function in the system. The communication system of the present invention is a wireless communication system in which a mobile (portable) device, referred to as the client, is able to receive and transmit communications. The client is notified that a communication request has been initiated to it. In response to this notification, the client establishes communication with a service access device to complete the two-way communication. That is, call initiator information is transferred to the client. When this information is received by the client, thereby indicating to the client that some form of response is requested (e.g., a two-way communication), the client of the present invention locates a service access device suitable to complete the requested two-way communication. The service access device is a device that interfaces with at least one other communications medium and coordinates access to that medium for the client.

In the present invention, the client is paged with a call initiation message. The call initiation request message is transmitted using a broadcast mechanism, such as a paging system. The client contains a paging radio receiver that will reliably receive messages within the page service area. In this manner, the client does not have to register to receive call initiation messages.

In the present invention, a separate transmission medium is used by the client to respond when the client has been targeted. In one embodiment, the client response is in the form of the telephone call initiated through the separate transmission medium. Because the response is generated using transmission medium distinct from the one used to initiate the communication (i.e., the paging medium) and because the client is responsible for initiating its response, the message, including its call information, may be sent to the client without knowledge by the source of the location of the client. In this manner, no routing of information is required by the source.

One Embodiment of the Communications System of the Present Invention

The communications system of the present invention may be used to transmit and receive either voice or data communications. The present invention permits the sending and receiving (i.e., two-way exchange) of data (or voice), to specific, addressed targets. One embodiment of the communications system of the present invention is shown in FIG. 1.

Referring to FIG. 1, a source 100 generates a message 101. Source 100 may be a user telephoning a message (e.g., a phone number). Source 100 may be a messaging center or a system designed to permit the creation of messages, such as message 101. Message 101 may include communication initiation messages, such as "call back at number xxx-xxxx" or "call back at number xxx-xxxx to receive a downloaded file." Message 101 may also comprise short messages, such as calendar updates, etc.

Message 101 is sent to paging system 102 which sends the message to client 103. Client 103 receives message 101. In response to message 101, client 103 engages in communication with service access device 104. Service access device 104 may access a service directly or may set up a communication link between client 103 and communication service 105. Once the communication link has been set up between client 103 and communication service 105, client 103 is able to respond to message 101 by communicating to response location 106.

Paging system 102 pages client 103 by sending message 101. Paging system 102 pages client 103 using a wireless communications link 110. The communications system of the present invention is able to page devices in the system to establish two-way call or short messages delivery. In one embodiment, paging system 102 comprises a pager radio system. In the present invention, a "paging" system refers to any communication medium optimized for short messages and communications requests that may be widely broadcast, including those which are capable of broadcasting messages worldwide. With a paging-type system, client 103 may be reached over a wide broadcast range. The paging-type system eliminates the system cost and complexity associated with tracking the movements of all system users.

Client 103 is a mobile communication device capable of receiving short messages from paging system 102. Client 103 is also able to fulfill the communications requests defined by message 101. To respond to message 101, client 103 is capable of establishing communications with response location 106 either directly or by using communication service 105. Thus, client 103 is able to establish a communication link with communication service 105. In one embodiment, client 103 is a small hand-held or notebook class computing machine. Client 103 is capable of receiving message 101 and communications requests via paging system 102 (e.g., pager radio). These communications requests may include a request to establish a two-way communication via a telephone system or local area network (LAN). In the case where system 102 is a paging radio system, client 103 includes a paging receiver for receiving messages 101.

Client 103 also includes hardware for establishing a communications link 111 with service access device 104. Client 103 uses the separate communications link 111 in order to locate service access device 104. In the present invention, wireless communications link 111 is a very short range communications medium designed for two-way connections. In one embodiment, wireless communications link 111 is a short-range communications medium limited to providing communications within a distance of under 200 ft. Any short range communication medium may be used for this purpose in the present invention. In one embodiment, infrared or very short range radio may be used. In this case, the present invention uses a two-way high bandwidth connection via infra-red or short-range two-way radio to provide communications between client 103 and service access device 104.

Service access device 104 couples client 103 to communication service 105 so that client 103 is able to perform its two-way communication function. Service access device 104 interfaces both the wireless communications link 111 and communication service 105 to provide a communication pathway from client 103 to response location 106. In one embodiment, service access device 104 also determines whether client 103 may access communication service 105. Service interface device 104 may include a desktop personal computer that includes a serial or parallel cable and a translation module capable of communicating by wireless communications techniques such as infrared or radio, to accommodate communication with client 103. In one embodiment, service access device 104 is coupled to communication service 105 at a connect point in its close proximity. In order to provide the connection to communication service 105, service access device 104 may include a wireless media interface, modem and controller.

Communication service 105 provides a communication link to response location 106. In one embodiment, communication service 105 includes an existing communications system, such as the public switched telephone network. In this case, via the normal phone system using the phone number received from their original page message, client 103 is able to initiate a communication connection via normal telephone service (i.e., the public switched telephone system) to response location 106 controlled by service access device 104. In this case, service access device 104 may include a modem and/or voice telephone data access arrangement to connect to the communication service 105.

The Protocol of the Present Invention

Figure 2:
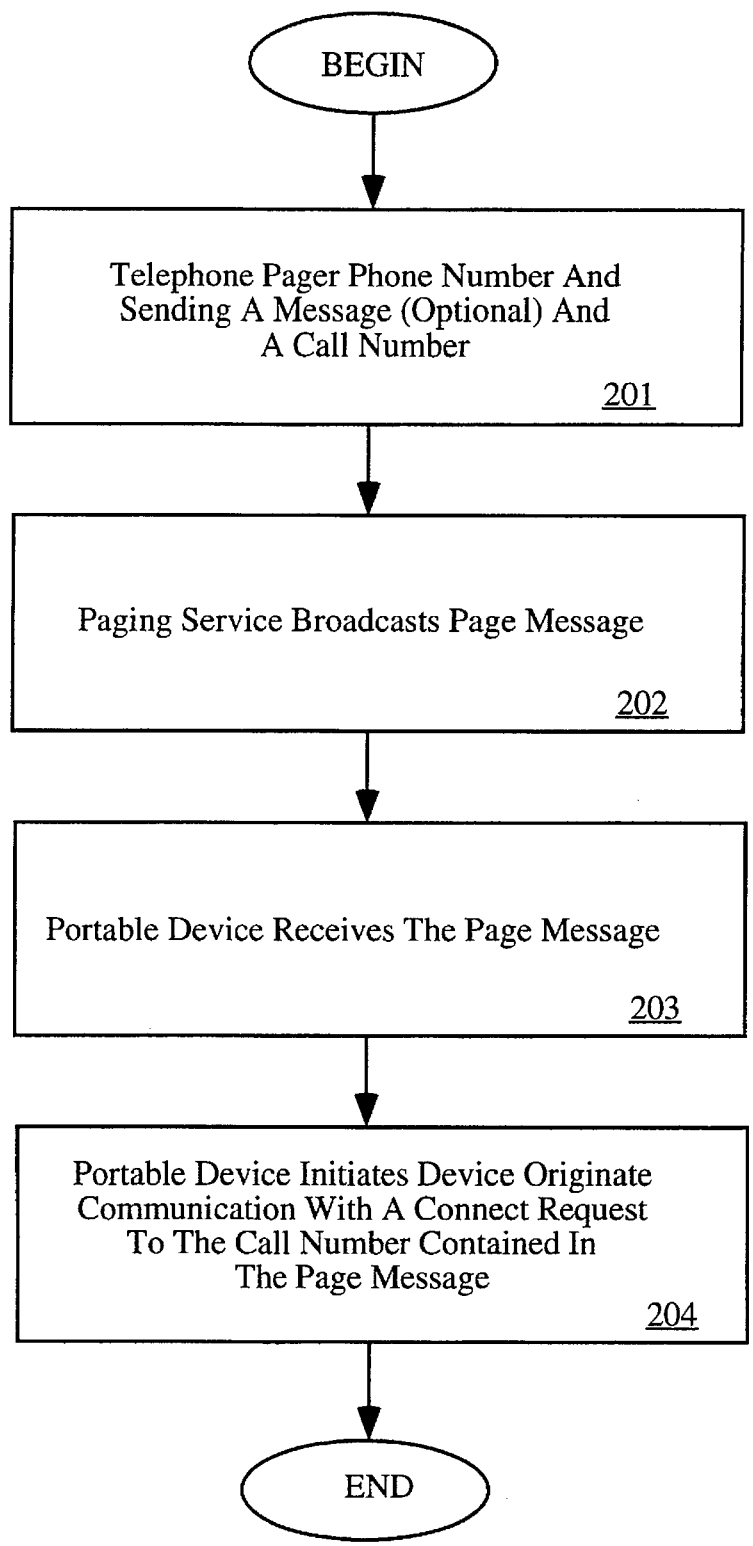
FIG. 2 is a flowchart of a communication on the communications system of the present invention.
Figure 3A:
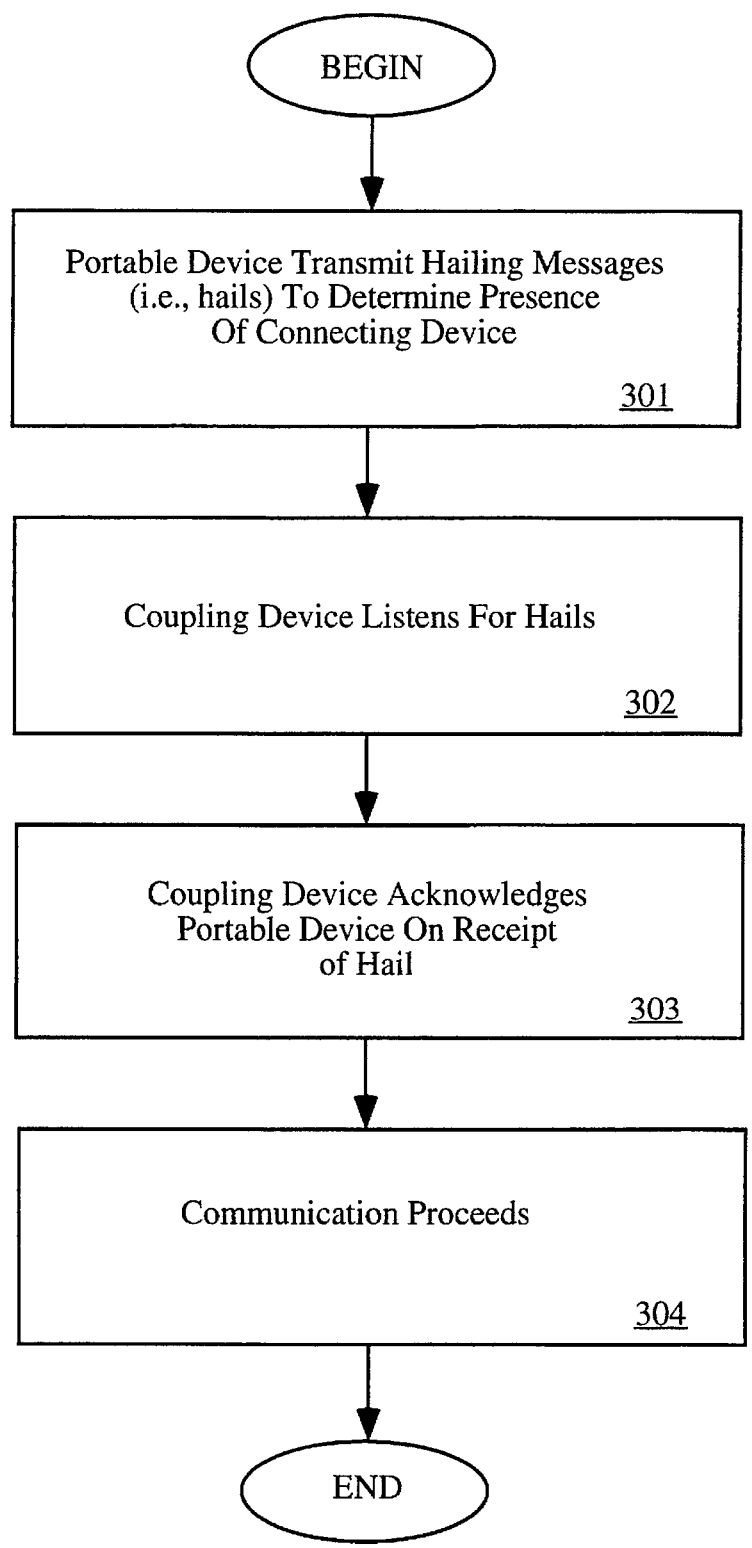
FIGS. 3A and 3B are flowcharts depicting device originated communications according to the present invention.
Figure 3B:
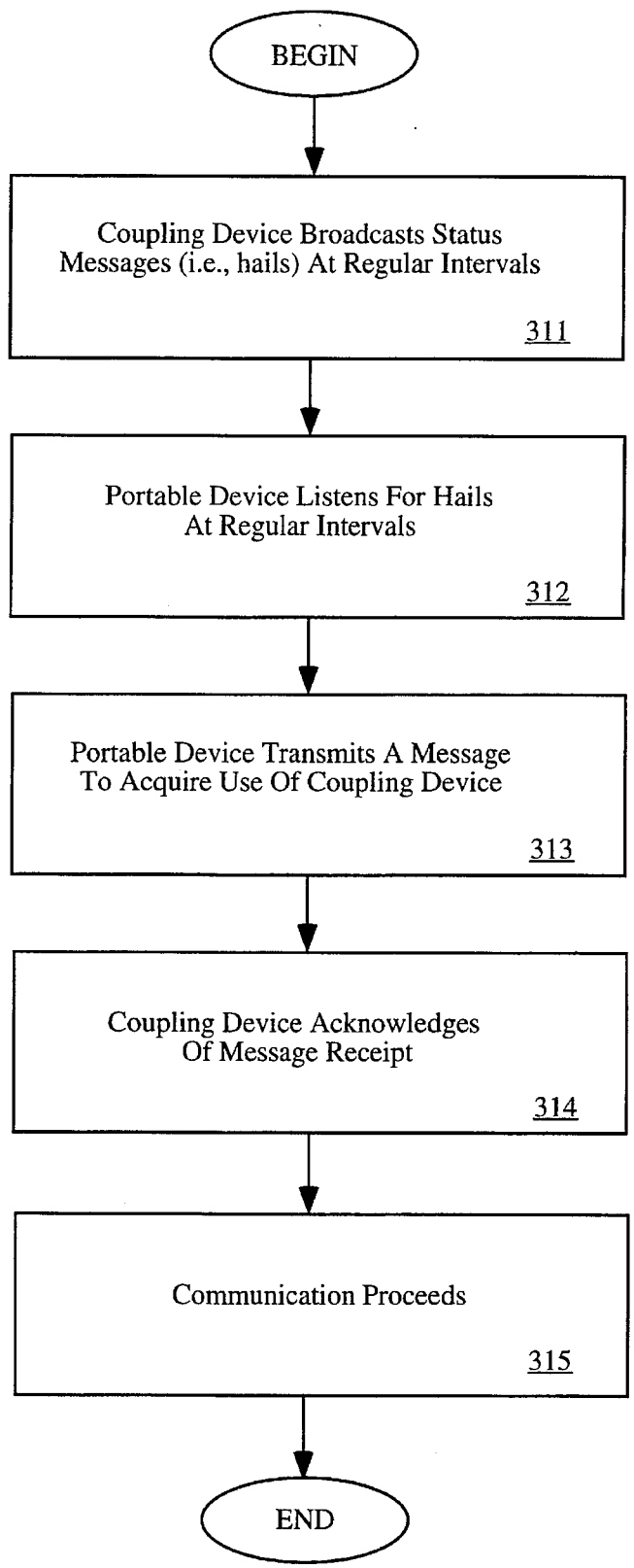

The protocol of the present invention is depicted in the flow diagrams of FIGS. 2, 3A and 3B. FIG. 2 illustrates communications originated by other than the client, while FIGS. 3A and 3B depict communications originated by the client.

The flowchart in FIG. 2 illustrates the protocol of the present invention when a device other than the client wishes to originate a communication. Referring to FIG. 2, the device wishing communication with the client, referred to in FIG. 2 as the portable device, initially calls the pager phone number and sends a call back number (processing block 201). A short message may be sent as well. In response to the call, the paging system broadcasts the page message (processing block 202).

The portable device receives the page using a paging receiver (processing block 203). In response to the message, the portable device initiates a device originated communication using a connect request to the call back number contained in the pager message (processing block 204). The portable device, or client, then connects to another transmission media, such as the public telephone system, to respond to the message.

In the present invention, the device originated communication may occur according to the protocols described in FIGS. 3A and 3B. Referring to FIG. 3A, a communication begins by the portable device (i.e., the client 103) transmitting hailing messages (i.e., hails) to determine the presence of a service access device, referred in FIGS. 3A and 3B as a coupling device (processing block 301). In the present invention, these hailing messages are transmitted using a short-range transmission medium, such as infrared or radio to the coupling device. In the present invention, the coupling device may be a terminal used to couple the client to a communications medium. The purpose of the hailing message is to determine if a service access device is located within the range of the client so that the client may proceed with a communication. It should be noted that if the client is responsible for transmitting hailing messages, the client will require more power, therein consuming more power.

Next, the coupling device in the communications system listens for the hails from the portable device (processing block 302). In the present invention, this coupling device may be a modem or personal computer (PC) link. In one embodiment, the coupling device only listens when it is idle and/or when authorized. The authorization relates to whether the portable device is authorized to obtain access to the coupling device.

On receipt of a hail from the portable device, the coupling device acknowledges the portable device (processing block 303). In one embodiment, the coupling device acknowledges the portable device by sending identification (ID)information. In response to the ID information, communication begins between the portable device and the communication service (processing block 304).

FIG. 3B illustrates a flow chart of another protocol for communication between the client and the coupling device.

Referring to FIG. 3B, the protocol begins with the coupling device broadcasting status messages at regular time intervals (processing block 311). These broadcasted status messages, or hails, may be made by an infrared or radio communications mechanism. Each status message identifies the coupling device (e.g., its location) and the services that it can accommodate. The available services depend on the programming of the coupling device.

The portable device listens for hails (processing block 312). In one embodiment, the portable listens only at regular intervals. Once the user wishes to use the coupling device, the portable device transmits a message to acquire use of the coupling device (processing block 313). The portable device transmits the message using the short-range communication system (e.g., infrared, radio, etc.). Then the coupling device acknowledges the portable device (processing block 314) and communication begins between the portable device and the communications service via the coupling device (processing block 315). It should be noted that the coupling device acts as a slave device in its capacity. Also, both protocols depicted in FIGS. 3A and 3B are beneficial in that they do not require the user's attention in setting up the communications link.

As an example of the protocol of the present invention, when the client begins listening for a message indicating the availability of a service access device. It should be noted that these communications are deferred in nature, such that there is no requirement for an immediate response by the client. In other words, the client continues to listen until it finds itself in the presence of one of the service access devices (terminal devices).

A handshaking protocol is undertaken to establish whether or not it is appropriate for the client to utilize the service access device and the communications service. In other words, handshaking occurs to determine whether the service access device is authorized for use with the client. A determination occurs as to what services are available and whatever billing is necessary. For instance, a connection may be rejected due to the communication's bandwidths being different than those required by the client, such that the system is not able to accommodate the necessary data requirements. Also, if the message to be transmitted is very short, the user may accept a very fast, high cost means of transmission, while if the message is very large, the user may wish to wait until the service access device identifies itself as one having a very low cost means of transmission. Once the service access device determines that the client is authorized to use the communications service, the service access device interfaces communications from the client on the wireless communications link to the communications service.

Communications Hardware of the Present Invention

As discussed above, the communications devices of the present invention include two components: a roving client and a service access device, referred to as a communications terminal.

In one embodiment, the present invention may include the following:

a) a handheld notebook, or portable, computer or information device;

b) a radio pager receiver;

c) a short range wireless transmission mechanism, such as infrared or radio (e.g., spread spectrum);

d) a smart modem having:
 1) originate telephone connect capability,
 2) compatible infrared or radio device (or other short range mechanism,
 3) protocol and software to allow unattended call session as described below;

e) a personal computer connection;

f) a software system to implement the communications, services and protocols.

Figure 4:
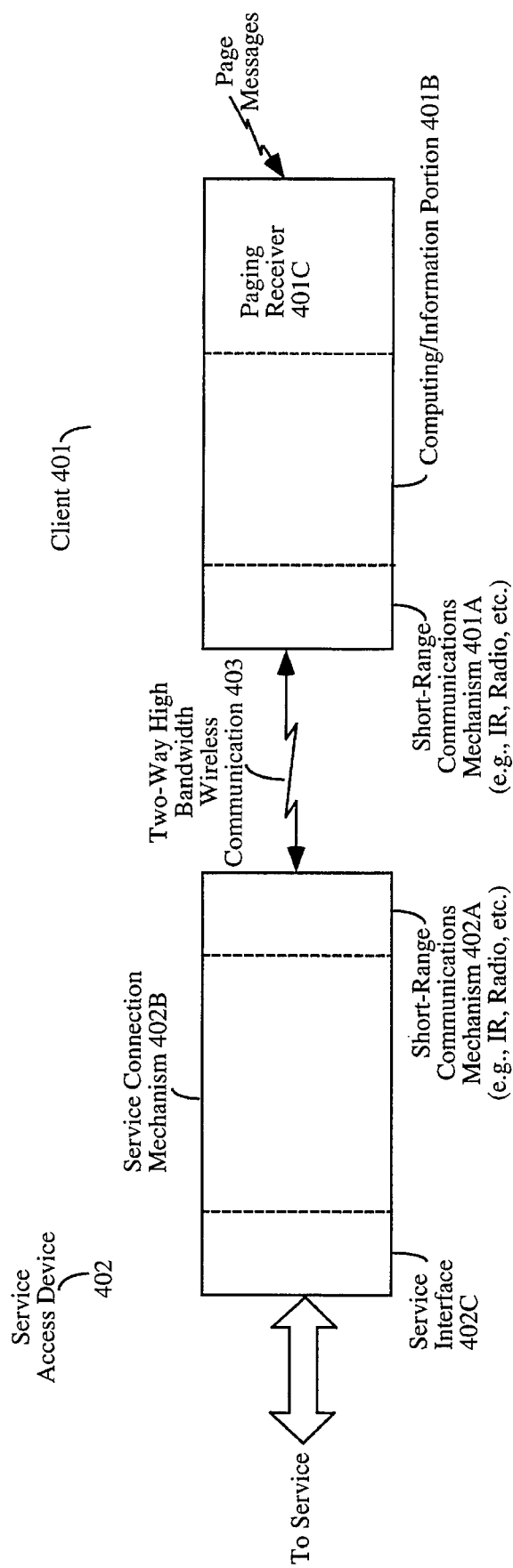
FIG. 4 is a block diagram depicting the coupling of the client and the coupling device.

Such a roaming communication system is shown in FIG. 4. Referring to FIG. 4, client 401 is shown coupled to service access device 402. Client 401 is shown having a radio paging receiver 401C for receiving page messages, computing/information portion and/or voice terminal device 401B, and a short-range communications mechanism (e.g., infrared, radio, etc.) 401A. Client 401 may be a battery-powered device. In one embodiment, client 401 is a digital hand held communicator, voice terminal or similar functioning device. Client 401 of the present invention may be an accessory to a notebook computer that either fits in the PCMCIA slot, an accessory slot, or at the end of a serial port.

A two-way wireless communications link 403 couples client 401 and service access device 402. In one embodiment, communications link 403 is a high bandwidth communications link. Upon receipt of a paging message, client 401 of the present invention merely locates the nearest connect point that is on the premises or in its immediate area. The owner of the premises may have already installed such a service access device 402. Thus, the present invention does not have to transmit large distances itself. Client 401 locates a service access device 402 by examining the surrounding area (via the wireless communications link 403).

Service access device 402 comprises a terminal device to provide communications capability to a communication service. Service provider 402 includes a front end wireless transmit mechanism or short-range communication mechanism 402A which may be an infrared device (e.g., infrared diode and infrared diode detector) or some low power radio means (e.g., speed spectrum radio). In one embodiment, this front-end wireless mechanism is a radio transceiver.

A service controller or connection mechanism 402B controls service access device 402 to operate as a terminal. Service connection mechanism 402B may include a controller which might be specialized hardware or it might be a programmed microcontroller. The controller is responsible for maintaining the integrity of the data and terminating any virtual circuit connections and other supervisory hook-ups. The same controller or additional hardware can be utilized for maintaining access criteria depicting the kinds of service type availability and the authorizations.

The service access device 402 (e.g., communications terminal) may be coupled to the public telephone system network or some other communication means. In one embodiment, the terminal device may have a modem, built on the front end that includes a plug for a telephone. The telephone plugs into the backside of the device into the modem portion, with the other portion being the microprocessor controller.

In one embodiment, service access device 402 may be one device or two devices that talk to client 401. One device communicates to a terminal and forms a slave terminal that connects either to a phone system, to a personal computer (PC) or to an information device. In the case that service access device 402 is part of a PC, an interface is included to either the user or the user client hardware to initiate and conduct services.

In the present invention, service access device 402 may be automated to accept calling requests from any user. In one embodiment, software handles billing, such that the calls may be forward billed. The forward billing could be to another number of an automated billing service.

The present invention includes a mechanism between client 401 and service access device 402 (e.g., the terminal) to identify and negotiate a service rate, wherein client 401 chooses to utilize or not to utilize that mechanism. In order to negotiate a service, in one embodiment, one of these devices that may communicate as a server might be physically coupled to a personal computer as opposed to a switch telephone network or it may physically coupled to a local area network (LAN). The present invention may provide a mechanism to discriminate between services. For instance, if there is a service with restricted bandwidth or expensive bandwidth which would not provide for an economical transmission, the present invention is able to defer any transmission until more economical or more suitable transmission services are available.

In the present invention, terminal connectors of service access device 402 may be used to require an ID so when they are hailing to implement the handshake negotiation with client 401. By doing so, the present invention is able to defer operations until the device comes within range. At that time, deferred operations could take place.

The communication system of the present invention also includes a mechanism for creating a virtual circuit. In other words, the present invention includes a mechanism for managing client 401 and service access device 402 that are communicating with each other, such that devices 401 and 402 are able to identify when communication ceases. This information allows service access device 402 to terminate the virtual circuit. Both devices 401 and 402 may change to a standby state in order to conserve battery power.

The system of the present invention can be utilized for a wireless interconnection between a mobile device and accessory functions such as interconnect with a PC, a disk drive, a printer, or with another mobile client, or pocket computer.

One advantage of the present invention is that the communications system uses less power. The power required to transmit is generally much greater than the power required to receive. Since the client does not have to transmit messages to register, the only portion of the client that requires a regular source of power is the receiver portion. However, when receiving, the client is still in a lower power state in comparison to when the system is transmitting. Thus, in this manner, power is conserved. Note that other techniques exist to further reduce power during receiving. For instance, the client may only actively listen at certain or regular time intervals (i.e., duty cycling). These time intervals may be specified according to a timing mechanism. For example, the client may only listen after a timer has timed out. In this case, the only power necessary is the power used to track time and the power used in powering the receiver after time-out. Thus, the present invention offers a reduced power consumption communication system.

Further, in order to save battery power, a client device of the present invention uses high bandwidth transmit over the shortest possible range. This saves power because transmit power increases rapidly with increases in range. Therefore, by limiting the range, less power is used, thereby saving power.

Also, the high bandwidth two-way system of the present invention does not have to keep track of location of the client. That is, there is no registration requirement. Therefore, the system of the present invention does not have to keep track of routing information that would be required to steer a data transmission to the client. In fact, the present invention uses the already existing phone system or LAN data networks.

Another advantage of the present invention is that the infrastructure required to implement the system is reduced. The present invention uses the existing communications systems integrated as a separate system. In one embodiment, the existing infrastructure of the public switched network is used in conjunction with the present invention. In this manner, a new, non-existing infrastructure is not required.

The present invention is also scaleable. As more service access devices are installed, the systems utility increases. The present invention does not require that an infrastructure to be universally installed up front before the system is useful. Therefore, the present invention allows for incremental additions to the system. As more and more devices are integrated into the system, it becomes more useful.

The present invention also does not require new regulations, such as FCC approval. The present invention does not require intervention from the phone company to implement its use.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a wireless communications system has been described.

I claim:

1. A method of performing communication comprising the steps of:

paging a portable device with an indication to a portable device that a callback communication is requested;

receiving the indication;

locating a nearest coupling device comprising the steps of
the portable device transmitting a hailing message to locate the nearest coupling device,
listening for the hailing message, and
acknowledging the portable device on receipt of the hailing message, such that the portable device interfaces with a non-paging communications medium;

establishing a short range communication link between the portable device and the nearest coupling device;

establishing a second communications link between the nearest coupling device and the non-paging communications medium to establish a communications link for the callback communication between the portable device and the non-paging communications medium at a time after and independent of when the indication is received by the portable device; and the portable device performing the callback communication using the non-paging communications medium via the coupling device.

2. The method defined in claim 1 wherein the short range communication link comprises a wireless communications link.

3. The method defined in claim 2 wherein an infrared communications link is established between the portable device and the coupling device.

4. The method defined in claim 2 wherein a radio communications link is established between the portable device and the coupling device.

5. The method defined in claim 1 wherein the step of initiating a communication includes the steps of:
   transmitting a status message originated from the coupling device indicative of the availability of the communications medium;
   the portable device listening for the status message;
   the portable device transmitting a message to allow the portable device to gain access to the communications medium using the coupling device; and
   acknowledging the portable device on receipt of the messages, such that the coupling device interfaces the portable device to the communications medium.

6. A method of performing communications comprising the steps of:
   transmitting a paging message with an indication to a portable device that a communication is requested;
   receiving the indication;
   locating a nearest coupling device comprising the steps of
      the portable device transmitting a hailing message to locate the nearest coupling device,
      listening for the hailing message, and
      acknowledging the portable device on receipt of the hailing message, such that the portable device interfaces to a non-paging communications medium;
   establishing a short range wireless communication link between the portable device and the nearest coupling device, wherein the nearest coupling device interfaces to a second communication link to allow the communication, wherein the step of establishing a short range wireless communication link comprises the steps of:
      the nearest coupling device transmitting a status message to indicate availability of the second communications link,
      the portable device listening for the status message,
      the portable device transmitting a message to the nearest coupling device to gain access to the second communications link via the nearest coupling device, wherein the portable device transmits the message at a time after and independent of when the indication is received by the portable device, and
      the nearest coupling device acknowledging the portable device on receipt of the message to permit the portable device to use the second communications link; and
   performing the communication from the portable device using the second communication link.

7. The method defined in claim 6 wherein the step of transmitting a paging message comprises the steps of paging the portable device.

8. The method defined in claim 6 wherein the paging message comprises a call number.

9. The method defined in claim 6 wherein the step of establishing a wireless communications link comprises establishing a radio communications link.

10. The method defined in claim 6 wherein the step of establishing a wireless communications link comprises establishing an infrared communications link.

11. The method defined in claim 6 wherein the second communications link comprises a telephone communications link.

12. A method of performing communications comprising the steps of:
   transmitting a paging message with an indication to a portable device that a communication is requested;
   receiving the indication;
   locating a nearest coupling device;
   establishing a short range wireless communication link between the portable device and the nearest coupling device, wherein the nearest coupling device interfaces to a second communication link to allow the communication, wherein the step of establishing a short range wireless communication link comprises the steps of
   transmitting a hailing message to locate the nearest coupling device at a time after and independent of when the indication is received by the portable device;
   the nearest coupling device listening for the hailing message; and
   the nearest coupling device acknowledging the portable device on receipt of the hailing message to permit the portable device to use the second communications link; and
   performing the communication from the portable device using the second communication link.

13. A communication system comprising at least a portable computing device and a service access device, wherein
   the portable computing device comprises
      a paging receiver,
      a computing portion, and
      a communications mechanism to send and receive short-range wireless communications, wherein the communications mechanism locates the nearest service access device by transmitting a hailing message;
   the nearest service access device to interface the portable computing device to a communication link, wherein the nearest service access device comprises a short range wireless communications mechanism in response to the hailing message to communicate with the portable computing device, such that the portable computing device performs a call on the communications link via the nearest service access device in response to a page received on the paging receiver.

14. The system defined in claim 13 where the communications link comprises a telephone communications link.

15. The system defined in claim 13 wherein the communications mechanism includes means for performing radio communications.

16. The system defined in claim 13 wherein the communications mechanism includes means for performing infrared communications.

17. The system defined in claim 13 wherein the communications mechanism includes a two-way high bandwidth communication link.

18. The system defined in claim 13 wherein the second means includes a translation module to communicate using the communications mechanism.

19. The system defined in claim 13 wherein the second means including an interface between the telephone system and the communications mechanism.

20. The system defined in claim 14 wherein the second means includes a telephone line interface.

21. The system defined in claim 14 wherein the second means includes means for originating communications on the telephone system.

22. A system comprising:
   a paging system, operable to transmit a message over a wireless communications link;
   a service access device, operable to send and receive communication over a wireless communication link; and
   a portable client, comprising:

(i) a computing machine, operable to store information and to perform computations thereon;
(ii) a paging receiver, coupled to said computing machine, operable to receive said message and to provide the same to said computing machine; and
(iii) a communication mechanism, coupled to said computing machine, operable to send and receive communication over said wireless communication link responsive to commands from said computing machine, said communication mechanism locating a nearest service access device by transmitting a hailing message, said communication mechanism interfacing with said nearest service access device in response to receiving an acknowledgment of said hailing message.

23. The system of claim 22 wherein said message is indicative of a file to be downloaded to said portable client and said file is sent from said service access device to said portable client as said communication.

24. The system of claim 22 wherein said service access device transmits hailing messages and said communication mechanism listens for said hailing messages prior to transmitting a message to acquire use of said service access device.

25. The system of claim 22 wherein said portable client chooses to use or not use said service access device based on a service rate of said service access device.

* * * * *